US007613479B2

(12) United States Patent
Twigg et al.

(10) Patent No.: US 7,613,479 B2
(45) Date of Patent: *Nov. 3, 2009

(54) AUTOMATIC DEVICE CONFIGURATION TO RECEIVE NETWORK SERVICES

(75) Inventors: Rebecca L. Twigg, Redmond, WA (US); Zlata Koro, Mill Creek, WA (US); Bonnie L. Beeman, Renton, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/662,752

(22) Filed: Sep. 15, 2003

(65) Prior Publication Data

US 2005/0059385 A1  Mar. 17, 2005

(51) Int. Cl.
*H04M 1/00* (2006.01)
(52) U.S. Cl. .................... 455/558; 455/433; 455/435.1; 455/414.1; 455/466; 455/559; 455/550; 455/41.2; 455/41.3
(58) Field of Classification Search ................ 455/433, 455/435.1, 414.1, 466, 558
See application file for complete search history.

(56) References Cited

U.S. PATENT DOCUMENTS 5,915,225 A * 6/1999 Mills ........................... 455/558
6,014,561 A   1/2000 Moelne et al.
6,603,969 B1 * 8/2003 Vuoristo et al. ............ 455/433
2002/0078185 A1 6/2002 Swerup et al.
2004/0093418 A1 * 5/2004 Tuomi ........................ 709/228

OTHER PUBLICATIONS

"Changes to 23.057 Sections 1-8; TS 23.057; Version 4.20" 3GPP TSG-T2, [Online] Oct. 18, 2001, Retrieved from the Internet: URL<http://www.3gpp.org/ftp/tsg_t/WG2__Capability/SWG1/SWG1__11__Portland/Docs/T2-MExE-010106%20-%20Changes%20to%2023.057%20-%20Sections%201-%208.doc> [retrieved on Sep. 28, 2006], p. 9, paragraph 4.9.2, p. 9, paragraph 4.9.3.
"Digital cellular telecommunications system (Phase 2+); Universal Mobile Telecommunications System (UMTS); USIM/SIM Application Toolkit (USAT/SAT); Service description; Stage 1 (3GPP TS 22.038 version 5.3.0 Release 5); ETSI TS 122 038" ETSI Standards, European Telecommunication Standards Institute, Sophia Antipolis Cedex, FR, vol. 3-SA1, No. V530, Jun. 2003, ISSN: 0000-0001.

* cited by examiner

*Primary Examiner*—Charles N Appiah
*Assistant Examiner*—Randy Peaches
(74) *Attorney, Agent, or Firm*—Moazzam & Associates, LLC

(57) ABSTRACT

In response to activation of a SIM in a terminal device, the SIM requests device information from the terminal device. The device provides the device information to the SIM and the SIM formulates a communication comprising the device information and subscriber information and causes the communication to be transmitted to a network.

12 Claims, 6 Drawing Sheets

AUTOMATIC DEVICE CONFIGURATION TO RECEIVE NETWORK SERVICES

TECHNICAL FIELD

The present disclosure relates to configuration of devices to receive services from a network.

BACKGROUND

Wireless telephones are popular, ubiquitous devices. It is now possible to make and receive phone calls from almost any place in the world. Communication is even possible from remote and undeveloped areas using wireless satellite telephones. Herein, the term wireless telephone refers to any device capable of transmitting and receiving voice and/or data (non-voice) information to and from a network without the use of wires, cables, or other tangible transmission media. So-called cellular telephones are a common example of wireless phones.

Wireless telephones and the networks by which they communicate operate according to various technologies, including analog mobile phone service (AMPS), circuit switching, packet switching, wireless local area network (WLAN) protocols such as IEEE 802.11 compliant networks, wireless wide-area networks (WWAN), short-range RF systems such as Bluetooth, code division multiple access (CDMA), time division multiple access (TDMA), frequency-division multiplexing (FDM), spread-spectrum, global system for mobile communications (GSM), high-speed circuit-switched data (HCSD), general packet radio system (GPRS), enhanced data GSM environment (EDGE), and universal mobile telecommunications service (UMTS). Of course, these are only examples, and other technologies may be employed in wireless communication as well.

Herein, the term 'wireless device' is meant to include wireless telephones (including cellular, mobile, and satellite telephones), and also to include a variety of other wireless devices, including wireless web-access telephones, automobile, laptop, and desktop computers that communicate wirelessly, and wireless personal digital assistants (PDAs). In general, the term 'wireless device' refers to any device with wireless communication capabilities.

Many companies produce wireless telephones and other wireless devices. Among the more well-known producers are Nokia®, Ericsson®, Motorola®, Panasonic®, Palm® Computer, and Handspring®. A variety of producers also provide wireless devices comprising versions of the Microsoft® Windows® operating software.

Modern wireless devices may accept a subscriber identity module (SIM). The SIM identifies a subscriber of the network by which the wireless device communicates. A "subscriber" represents one or more persons or entities (corporations, partnerships, agents, operators, etc.) with access privileges to the network. A subscriber may be or represent a single user, or may represent one or more users. "User" refers to any person (or, conceivably, autonomous or semi-autonomous logic) with access privileges to the network. Typically the user is the operator of a terminal device, although a user could also be the operator of a device or devices that provide services via the network.

"Terminal device" refers to any device employed by a user to access the network environment.

A "service" is information and acts available via the network. Examples of services include the Short Message Service (SMS), email, and stock quotes. A "service provider" is any device or combination of devices that provides services via the network environment. Typically, a service provider provides information delivery to terminal devices, and/or performs network actions in response to requests from terminal devices. A service provider may also provide information delivery and/or network actions on behalf of another service provider.

A problem may arise when devices are employed to access the network by multiple subscribers. For example, a first subscriber may employ a computer to access the network and may reconfigure the computer's settings to provide compatibility with the services that the subscriber is authorized to receive from the network. A second subscriber may later attempt to employ the computer to access the network and a set of services authorized for the second subscriber. However, the computer's configuration may be incompatible with the second subscriber's services, leading to problems with accessing the services and/or using the computer. Other problems may arise when a SIM is moved to a terminal device that is not configured for access to the network to which the subscriber has access privileges, and/or when the terminal device is moved to a location where the device configuration is insufficient to access network services. These problems in turn can lead to decreased customer satisfaction, increases in help calls, and lost revenue for the network operator and service providers.

SUMMARY

The present invention provides benefits over the prior art. A brief summary of some embodiments and aspects of the invention are first presented. Some simplifications and omissions may be made in the following summary; the summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the Figures, and from the claims (which follow the detailed description).

In response to activation of a SIM in a terminal device, the SIM requests device information from the terminal device. The device provides the device information to the SIM and the SIM formulates a communication comprising the device information and causes the communication to be transmitted to a network.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention.

Herein, "logic" refers to any information having the form of instruction signals and/or data that may be applied to affect the operation of a processing device. Examples of processing devices are computer processors (processing units), microprocessors, digital signal processors, controllers and microcontrollers, and so on. Logic may be formed from signals stored in a device memory. Software is one example of such logic. Examples of device memories that may comprise logic include RAM (random access memory), flash memories, ROMS (read-only memories), EPROMS (erasable programmable read-only memories), and EEPROMS. Logic may also be comprised by digital and/or analog hardware circuits, for example, hardware circuits comprising logical AND, OR, XOR, NAND, NOR, and other logical operations. Logic may be formed from combinations of software and hardware.

"Information" is configurations of matter representing knowledge, e.g. "data". Examples of information are collections of magnetic or optical bits.

A "network element" is any one or more devices of a communication network, e.g. devices that participate at least occasionally in the operation of the network.

Typically, a subscriber will enter into contractual arrangements with a network operator for access rights to the operator's network(s). Networks of this operator for which the subscriber has contractual access rights are the subscriber's "home networks." Networks other than the home networks of the subscriber are "roaming networks." The subscriber and the subscriber's wireless device are said to be "roaming" when accessing a roaming network.

Figure 1:
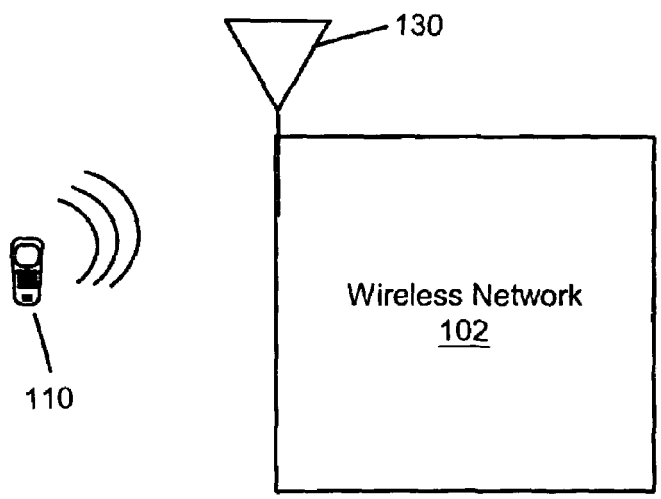
FIG. 1 is a block diagram of an embodiment of a wireless communication arrangement.

FIG. 1 is a block diagram of an embodiment of a wireless communication arrangement. A terminal device 110 communicates with a network 102. The network 102 receives signals from the terminal device 110 via antennae 130.

Figure 2:
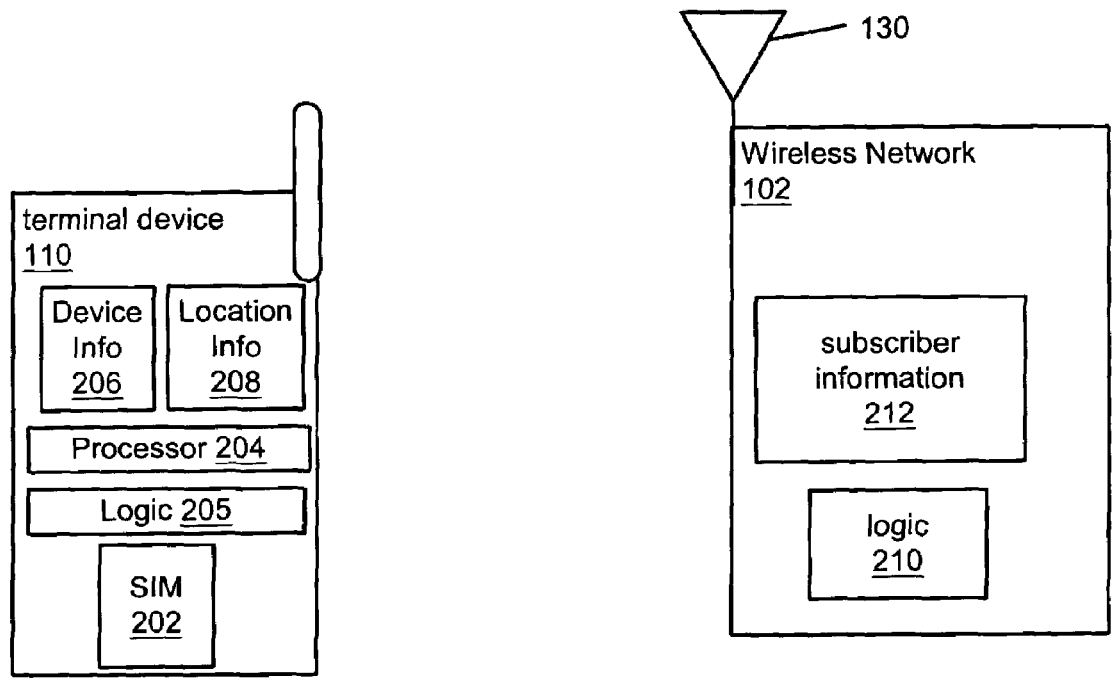
FIG. 2 is a more detailed block diagram of an embodiment of a wireless communication arrangement.

FIG. 2 is a more detailed block diagram of an embodiment of a wireless communication arrangement. The terminal device 110 comprises device information 206, location information 208, a processor 204, logic 205, and a subscriber identity module (SIM) 202. Device information 206 comprises information about the device's capabilities to receive, process, and display information. For example, device information may comprise information about the device's graphic display capabilities, communication bandwidth, and processor speed. Device information 206 may also include information about the device model, the version(s) of logic 205 comprised by the device (e.g. BIOS version, operating system version, software versions, etc.), the last know error to occur during the operation of the device, installed software applications, and language settings, among other things. Device information 206 may also comprise information about how the BIOS, operating system, installed software applications, and other components of the terminal device 110 are configured to operate.

The terminal device 110 comprises a processor 204 and logic 205. The logic 205, when applied to the processor, may cause the terminal device 110 to carry out acts of and in accordance with the methods described herein.

Location information 208 comprises information about the location of the terminal device 110. Such information may be useful in determining the type of information to deliver, the quality and quantity of information to deliver, and so on. In other words, location information may be useful when delivering services to the device. Location information may be 'literal', e.g. a geographic address or location, or 'logical', e.g. "In a Meeting", "In Transit", and so on.

The SIM 202 and the terminal device 110 may be coupled in such a manner that the two may be easily coupled and decoupled. For example, the SIM 202 may insert into a slot in the terminal device 110. A subscriber of the network may remove the SIM 202 from the terminal device 110 and couple it to another terminal device. Likewise, another subscriber may replace the SIM 202 in the device with another SIM representing the other subscriber.

The network 102 comprises subscriber information 212 and logic 210. Subscriber information 212 may comprise such information as a subscriber id, payment parameters, service provision information, service delivery information, billing and settlement information, access network information, and security and access control information.

The logic 210 may cause the network 102 to carry out acts of and in accordance with the methods described herein.

The subscriber id identifies a subscriber from among subscribers to the network. Payment parameters describe the manner and terms of payment. Examples are monthly subscription charges, flat-fee arrangements, per-use arrangements, pre-paid amounts, and so on. Service provision information describes a level or package of services available to the subscriber. Examples are premium, standard, and basic. Service delivery information describes a level of service available to the subscriber from the network. Examples include 100 Mbps (megabit per second) service, and guaranteed information delivery. Billing information describes how the subscriber is to be charged. This information may include the subscriber's billing address, credit or debit card information, and/or account numbers. Settlement information describes information about current charges to the subscriber. Examples include information about the subscriber's current charges, and due and past-due charges. Access network information describes the manners of network access the subscriber may employ. Examples include GPRS, 2G, 3G, and circuit switching. Security information describes how the subscriber may protect information communicated to or from the network. Examples are digital signature and encryption key information. Access control information describes how the subscriber may access information and/or acts available via the network to which access is controlled. Examples include id and password information.

The subscriber information 212 may comprise information about services available to the subscriber, e.g. those services which the subscriber is authorized to access. Services may be characterized by service information, including a service identifier, a service type, a service description, service requirements, performance requirements, quality of service information, network resource requirement information, network resource allowance information, and security and access control information.

The service identifier identifies the service from among services available via the network. The service type identifies the type of service, e.g. business, consumer, entertainment, etc. The service description describes the service, such as "Real-Time Stock Quotes". Service requirements describe requirements for the service to be properly provided. For example, service requirements may include information about the graphics, processor, memory, communications, payment capacity, and other requirements that a device, and/or user, and/or subscriber should meet in order for the service to be provided. The service requirement information may be organized according to categories, such as graphics, processor, memory, and communications. Of course these are merely examples of possible categories. The categories may be defined to correspond with the categories of the device information 206. For example, the graphics category may comprise information about the graphics requirements to properly render the service information, information such as the display size, graphics processor, and colors that a device should employ to properly render the service to the user. The processor category may comprise information about the processing capabilities that need be employed by a device to properly receive and render the service (e.g. processor speed). The memory category may comprise information about the memory requirements to properly receive and render the service on a device (e.g. minimum available memory, memory speed). The communication category may comprise information about the communication requirements to properly receive and render the service on a device (e.g. bandwidth, codec).

Quality of service information describes the quality of service that the service requires from the network. Network resource requirement information describes the network resources that need be allocated in order to carry out the actions of the service. For example, the network resource requirement information may comprise bandwidth and memory allocation requirements. Network resource requirements may also include a relay server address and WAP gateway information, among other things. The network allowance information describes the network resources actually made available to carry out the actions of the service. For example, a streaming video service may require 10 Mbps of network bandwidth to deliver streaming video to terminal devices. However only 1 Mbps of bandwidth may be allowed. Security information describes how the information of the service is protected during communication over the network. Examples are digital signature and encryption key information. Access control information describes how the service provider may access information and/or acts available via the network to which access is controlled. Examples include id and password information.

Figure 3:
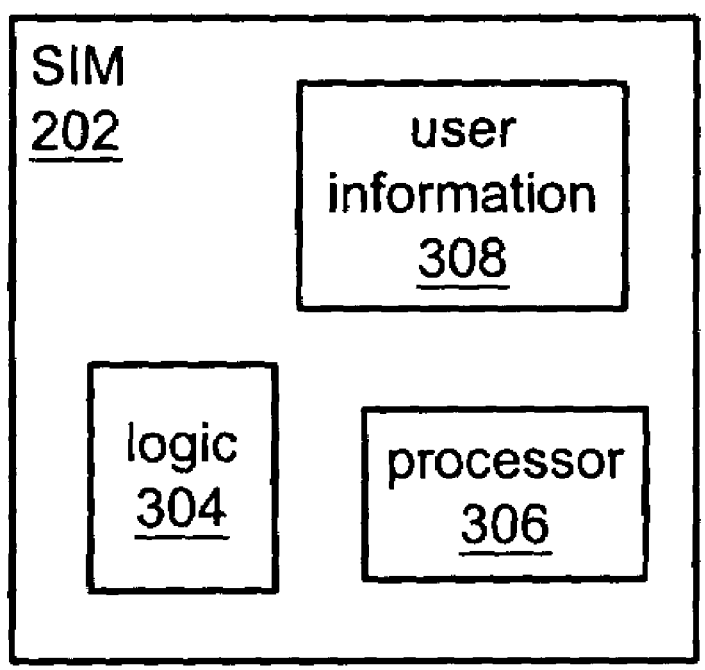
FIG. 3 is a block diagram of an embodiment of a SIM.

FIG. 3 is a block diagram on an embodiment 202 of a SIM. The SIM 202 comprises user information 308, logic 304, and a processor 306.

The logic 304, when applied to the processor 306, may cause the SIM 202 to carry out acts of and in accordance with the methods described herein.

The user information 308 may comprise information such as a user id, media delivery preferences, presence information, usage information, demographic information, association information, and personalization information.

The user id identifies a user from among users of the network. Media delivery preferences include information about the manner in which information should be communicated to the user. Examples include frame rate, color schemes, visual quality, and visual layout. Usage information comprises information about the user's access to the network environment, possibly including how, when, how often, and for what purpose the user accessed the network environment. Usage information may include information about which services a user accesses and/or how often, and/or the most recently used and/or most frequently accessed services. The usage information may also comprise information about trends and patterns in the user's usage behavior.

Personal information describes a user. Examples are the user's name and address, as well as a user's privacy information (restrictions on distribution of the user profile information). Demographic information may be used to classify a user for statistical, marketing, or other purposes. Examples include the user's age, race, and gender. Association information describes other users and/or subscribers that have an association with the user. The association information may also describe the nature of the association. Examples include associates, family members, and patrons.

Personalization information describes a user's preferred, most recent, and/or most frequent settings for services that the user may access. Examples include a user's preferred type of news information (sports, local events, etc.) and a user's most frequent and/or most recent search queries.

Security information describes how the user may protect information communicated to or from the network. Examples are digital signature and encryption key information. In various embodiments the subscriber security information may be applied to protect the communications of the users associated with the subscriber. Alternatively, or in addition, the user security information may be applied to protect the communications of the users associated with the subscriber, independent of one another.

Access control information describes how the user may access information and/or acts available via the network to which access is controlled. Examples include id and password information. In various embodiments the subscriber security information may be applied to provide the users associated with the subscriber access to restricted information. Alternatively, or in addition, the user access control information may be applied to provide the users associated with the subscriber independent access to the restricted information.

Figure 4:
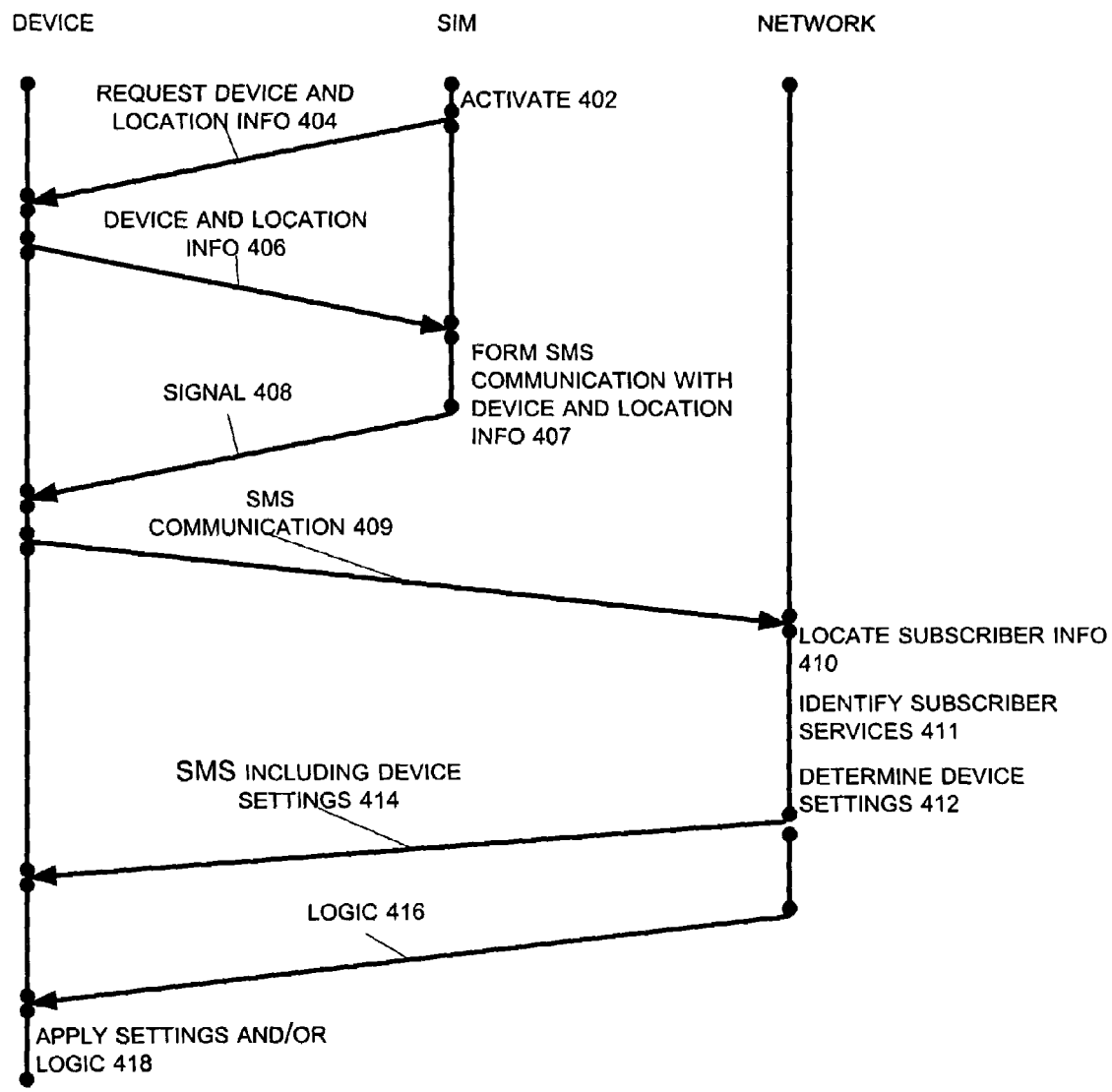
FIG. 4 is a flow chart of an embodiment of acts of configuring a device to access services of a network.

FIG. 4 is an action diagram of an embodiment of a method of configuring a device to access services of a network. At 402 a SIM is activated in the device. "Activation" can be triggered by different events, including coupling (e.g. inserting) the SIM into the device, powering on the device with which the SIM coupled, and pressing a button or otherwise issuing a command to the device. Activating the SIM results at 404 in a request to the device for device and location information. The device and location information are returned to the SIM at 406. At 407 the SIM formulates a communication including at least some of the device information, and possibly also at least some of the location information. In some embodiments the communication is formulated only when the terminal device is different than the terminal device used with a previous activation of the SIM. At 408 the SIM signals the device to transmit the communication to the network. The communication is transmitted at 409.

In one embodiment, the communication employs the Short Message Service (SMS) technique. SMS, otherwise known as text messaging, mobile messaging, or alphanumeric paging, allows for the communication of short text and numeric messages to and from wireless devices, as well as to and from public SMS messaging gateways on the Internet.

Another communication technique that may be employed is Enhanced Message Service (EMS). EMS supports the capabilities of SMS to communicate short text and numeric messages, but also includes capabilities for the communication of other types of data, including sound, animation, graphics, and additional text-formatting capabilities.

Yet another communication technique that may be employed is Multimedia Message Service (MMS). MMS provides for the communication of video and other advanced multimedia formats. Yet another communication technique that may be employed is SyncML. SyncML is based on the Extensible Markup Language (XML), and provides a standard manner of synchronizing data between devices and network applications.

At 410 the network locates subscriber information corresponding to the user information and/or device information communicated from the device. At 411 the network employs the subscriber information to identify those services that may be provided to the subscriber (e.g. those services available under the subscriber's subscription plan). At 412 settings for the device are determined The settings are based at least in part upon the identified services and also based at least in part upon the device information and/or user information (e.g. device capabilities to display and process information, and user preferences).

At 414 the network communicates the determined device settings to the device. The communication may be accomplished using SMS, EMS, MMS, SyncML, or some other technique. The network may also, at 416, communicate logic (e.g. software) to the device. At 418 the device applies the settings and/or logic to configure for the services available to the subscriber.

Embodiments of a wireless network will now be described in conjunction with FIGS. 5-7. In the description, particular network elements are identified that may comprise the subscriber information 212 and logic 210 to carry out acts described herein. These network elements are identified by way of example and not limitation, e.g. the subscriber information 212 and the logic 210 may be comprised by network elements other than those specifically identified in the figures.

Figure 5:
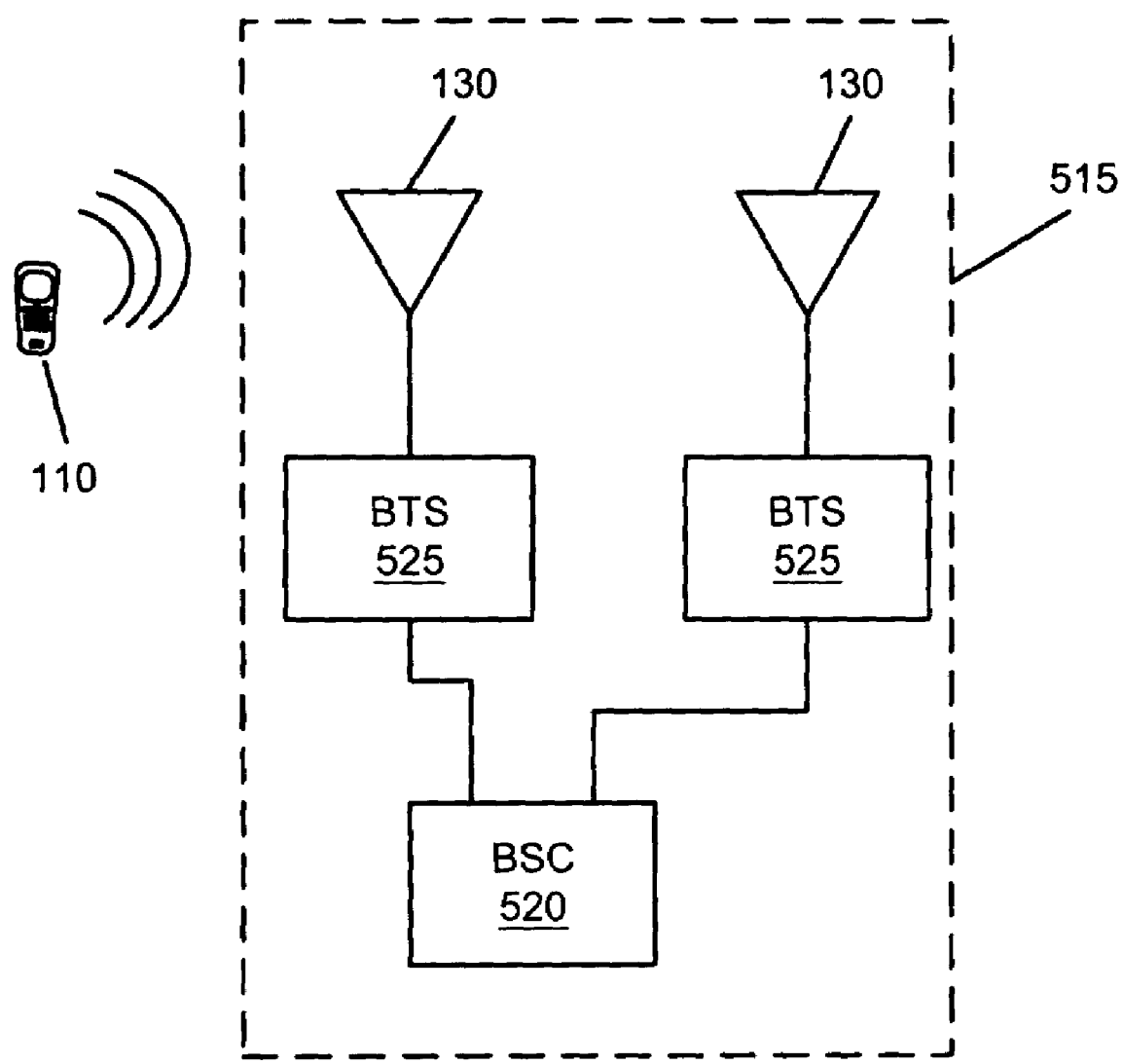
FIGS. 5-7 are block diagrams of embodiments of portions of a network environment.

FIG. 5 shows a block diagram of the base station subsystem of a wireless network. The base station subsystem (BSS) 515 consists of base station controllers (BSC) 520 coupled to one or more base transceiver stations (BTS) 525. In turn, each BTS 525 is coupled to one or antennae 130.

The BTS 525 includes transmitting and receiving equipment to create a radio interface between the wireless network and terminal devices. Although the antennae 130 is shown as a separate element for clarity, it is common in the industry to collectively refer to the antennae 130, transmitter, and receiver, as the BTS.

The BSC 520 may perform management of the radio interface by allocating channels, managing handover from one BTS to another, paging the wireless device, and transmitting connection-related signaling data.

Figure 6:
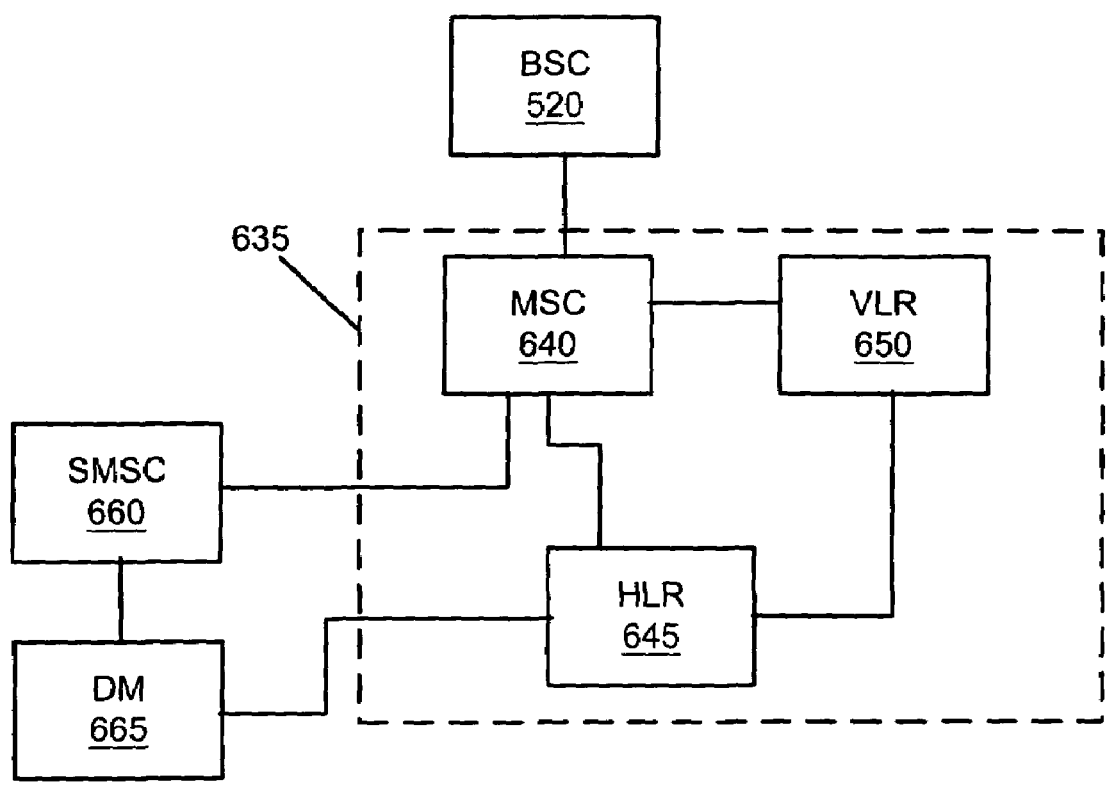

FIG. 6 is a block diagram of the networking and switching subsystem (NSS) 635 of a wireless network. The NSS 635 comprises a Mobile Switching Center (MSC) 640, a Home Location Registry (HLR) 645, and a Visitor Location Registry (VLR) 650. Switching and network management functions are carried out by the NSS 635. The NSS 635 may also act as a gateway between the wireless network and other networks such as the Public Switched Telephone Network (PSTN), Integrated Services Digital Network (ISDN), the Internet, other wireless networks, and the Public Data Network (PDN).

The MSC 640 is a digital switching mechanism that routes communications and manages the network. In GPRS networks, GPRS support nodes (GSNs) such as Switching GSNs (SGSNs) and Gateway GSNs (GGSNs) may provide switching operations similar to those provided by the MSC 640. There can be many switches 640 in a communication network, each responsible for the signaling required to set up, maintain, and terminate connections to wireless devices within the geographical area served by the switch 640. Each MSC (switch) 640 may manage several BSC 520. The MSC 640 is coupled to a Home Location Registry (HLR) 645 and a Visitor Location Registry (VLR) 650. The HLR 645 is also coupled to the VLR 650.

In one embodiment, at least part of the subscriber information 212 is comprised by the HLR 645. Also, the HLR 645 may comprise certain dynamic or temporary subscriber data such as current Location Area (LA) of the subscriber's mobile station and Mobile Station Roaming Number (MSRN). Subscriber-related data is recorded in the HLR 645 from which billing and administrative information is extracted when needed by the cellular service provider. Some wireless networks have only one HLR 645 that serves all subscribers; others have multiple HLRs.

In one embodiment, the MSC 640 comprises at least part of the logic 210 to locate subscriber data, identify subscriber services, determine terminal device settings, and communicate the settings and possibly associated logic to the terminal device. In one embodiment, the HLR 645 comprises at least part of the logic 210 for subscribers of the home network. The VLR 650 may comprise similar logic 210 for roaming subscribers.

The MSC 640 uses the VLR 650 to manage the wireless devices that are currently roaming in the area controlled by the MSC 640. The VLR 650 stores information such as the International Mobile Subscriber Identity (IMSI), authentication data, and telephone number of the roaming wireless devices. The VLR 650 may obtain and comprise subscriber information, such as information about the services to which a roaming wireless device is entitled, from the HLR that serves the wireless device. The VLR 650 controls a pool of MSRN and allocates an MSRN and TMSI to the roaming wireless device. The VLR 650 sends the MSRN and Temporary Mobile Subscriber Identity (TMSI) information to the HLR 645 where they are stored with the subscriber's dynamic records for later use in call routing.

A Short Message Service Center (SMSC) 660 may be coupled to the MSC 640 to provide for SMS communication to and from the network. The SMS communication from a terminal device may be routed by the SMSC 660 to a device management (DM) network element 665. The DM 665 may comprise a processor and at least part of the logic 210 to locate subscriber data, identify subscriber services, determine terminal device settings, and communicate the settings and possibly associated logic to the terminal device. The DM 665 may be coupled to one or more network elements comprising the subscriber information. For example, the DM 665 may be coupled to the HLR 645 in embodiments where the HLR 645 comprises the subscriber information.

In one embodiment the VLR 650 comprises at least part of the subscriber information for the users of wireless devices that are roaming the network 102.

Figure 7:
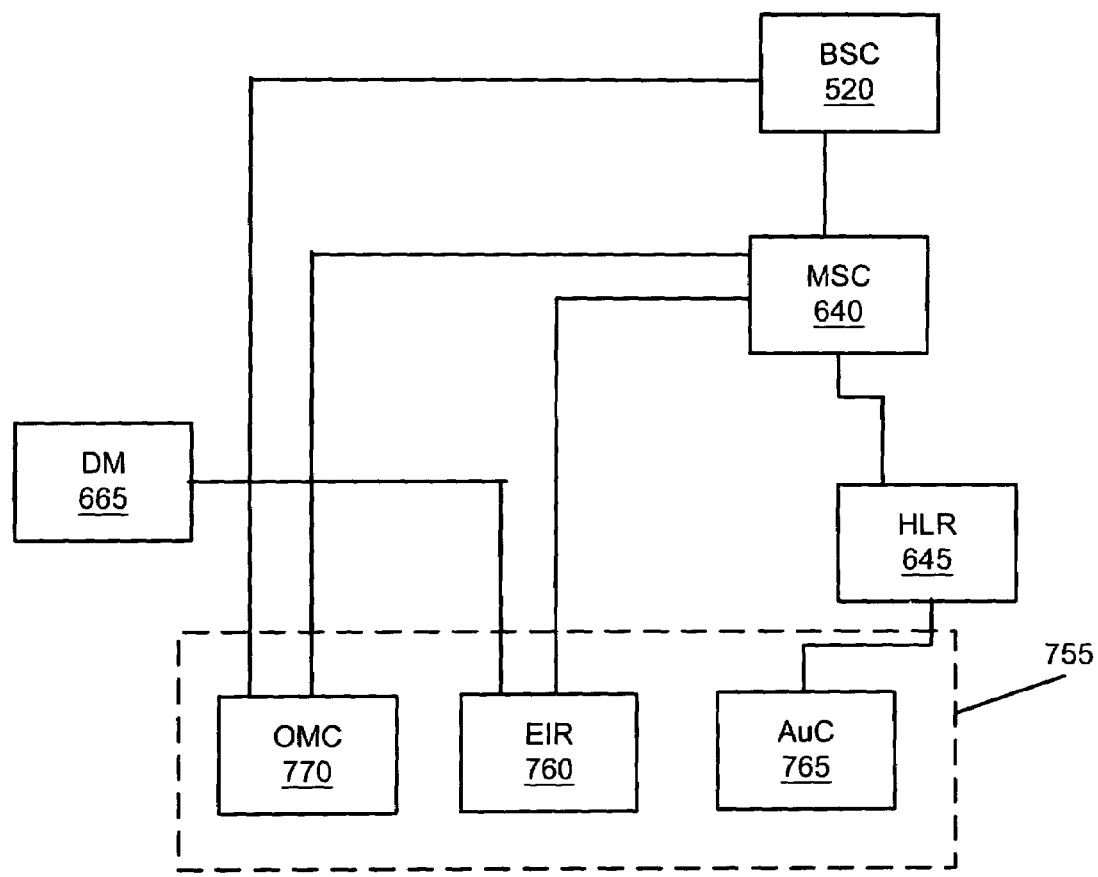

FIG. 7 is a block diagram of the operation subsystem (OSS) 755 of a network 102. The OSS 755 may include an Equipment Identity Register (EIR) 760, an Authentication Center (AuC) 765, and an Operating and Maintenance Center (OMC) 770. The OSS 755 may provide subscription management, network operation, network maintenance, and mobile equipment management.

The AuC 765 stores data related to network security and authentication of wireless devices and subscribers. A purpose of the AuC 765 is to prevent fraud by verifying the identity of subscribers and/or devices that try to access the network. Thus the AuC 765 may comprise authentication algorithms and encryption codes necessary to protect a subscriber's access rights and identity and to prevent eavesdropping.

The EIR 760 is a database which stores International Mobile Equipment Identity (IMEI) numbers. Wireless devices are uniquely identified by an IMEI or equivalent number such as an Electronic Serial Number (ESN). An EIR 760 generally indicates the status of a particular wireless device by flagging the IMEI of a device identified stolen, suspended, or malfunctioning.

The OMC 770 monitors and controls other network elements to enhance system performance and quality. The OMC 770 also administers billing, subscriber service data, and generation of statistical data on the state and capacity of the network.

In one embodiment, one or more of the AuC 765, EIR 760, and OMC 770 may comprise at least part of the subscriber information 212 and logic 210.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A network comprising:
   a base station subsystem;
   subscriber information; and
   one or more network elements to locate subscriber data in response to a SIM-generated communication from a terminal device that includes device capabilities to receive and render services, identify subscriber services compatible with the device capabilities, determine terminal device settings compatible with the identified services, and communicate the device settings to the terminal device;
   wherein the SIM-generated communication is generated in response to activation of a SIM in the terminal device, the SIM requesting device information from the terminal device and the device providing the device information to the SIM.

2. The network of claim 1 further comprising:
   one or more network elements to communicate with the terminal device using one of SMS, EMS, MMS, and SyncML.

3. The network of claim 1 further comprising:
   one or more network elements to communicate configuration software to the terminal device; the configuration software comprising logic that, when applied by the terminal device, effects the device settings.

4. The method of claim 1, further comprising:
   if the device is different than a device used in a previous activation of the SIM, the SIM formulating a communication comprising the device information and causing the communication to be transmitted to a network.

5. A method comprising:
   in response to activation of a SIM in a terminal device, the SIM requesting device information from the terminal device;
   the device providing the device information to the SIM; and
   the SIM formulating a communication comprising the device information and causing the SIM-generated communication to be transmitted to a network through the device.

6. The method of claim 5 further comprising:
   the SIM formulating the communication according to one of SMS, EMS, MMS, and SyncML.

7. The method of claim 5 further comprising:
   the device providing location information to the SIM;
   the SIM formulating a communication comprising the location information; and
   the SIM causing the communication to be transmitted to a network.

8. The method of claim 5 further comprising:
   receiving software from the network; and
   applying software to effect the terminal device settings to receive services from the network.

9. The method of claim 5 further comprising:
   the SIM formulating a communication comprising user information; and
   the SIM causing the communication to be transmitted to a network.

10. A method comprising:
    activating a SIM in a communication device;
    as a result of activation, the SIM requesting device and-or information from the communication device;
    the SIM forming at least one message including at least part of the device and-or location information;
    the communication device communicating the message formed by the SIM to a communication network;
    the network identifying services compatible with device and-or location information of the message;
    the network identifying device settings compatible with the identified services and-or device information and-or location information of the message;
    the network communicating the device settings to the communication device; and
    the communication device putting into effect the device settings communicated from the network.

11. The method of claim 10, further comprising:
    the communication device communicating the message to the network using at least one of SMS, EMS, MMS, or SyncML.

12. The method claim 10, further comprising:
    the network communicating the message to the communication device using at least one of SMS, EMS, MMS, or SyncML.

* * * * *